O. GRADBERG.
BRIDLE.
APPLICATION FILED APR. 8, 1914.

1,116,691. Patented Nov. 10, 1914.

Witnesses
Robert M. Lutphen
A. J. Hind.

Inventor
OLE GRADBERG

By Watson E. Coleman
Attorney

UNITED STATES PATENT OFFICE.

OLE GRADBERG, OF DUNNELL, MINNESOTA.

BRIDLE.

1,116,691.   Specification of Letters Patent.   Patented Nov. 10, 1914.

Application filed April 8, 1914. Serial No. 830,482.

*To all whom it may concern:*

Be it known that I, OLE GRADBERG, a citizen of the United States, residing at Dunnell, in the county of Martin and State of Minnesota, have invented certain new and useful Improvements in Bridles, of which the following is a specification, reference being had to the accompanying drawings.

This invention relates to new and useful improvements in bridles and more particularly to a driving bridle for draft animals, the main object of the invention being the provision of a bridle whereby the horse or the draft animal may be driven, guided and controlled successfully without employing a bit received in the mouth of the animal, thus relieving the horse of the discomfort, amounting in many cases to cruelty, and also to prevent the destruction of the teeth which is often occasioned by means of jerking or bad driving when mouth bits are used.

Another object of the present invention is the provision of a bridle of the above character which will possess advantages in points of efficiency and durability, is inexpensive to manufacture and, at the same time, is simple in construction and operation.

With the above and other objects in view, the invention consists in the novel features of construction, combination and arrangement of parts as will be hereinafter referred to and more particularly pointed out in the specification and claim.

Figure 1:
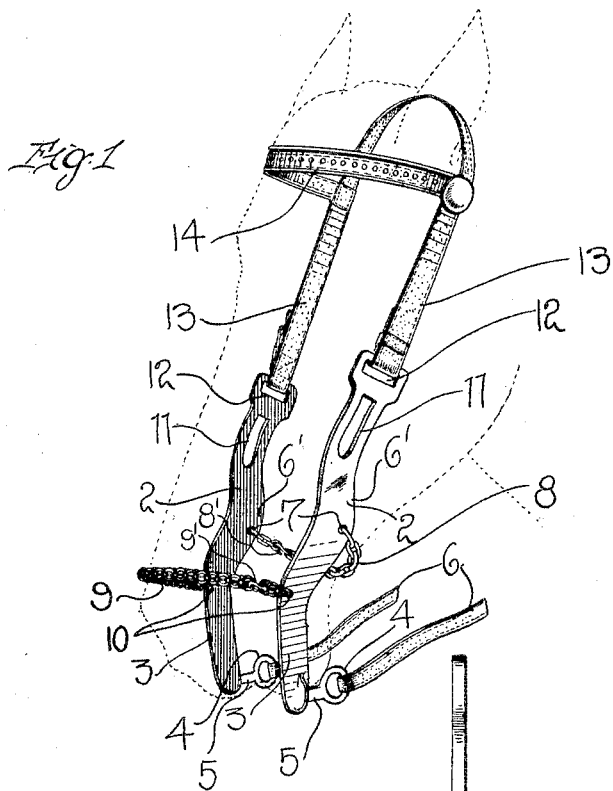
Figure 2:
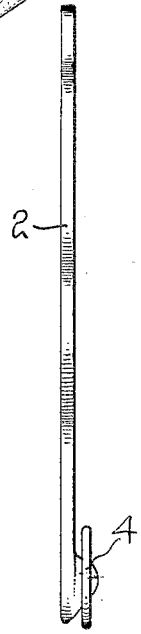

In the accompanying drawing forming a part of this application, Figure 1 is a detail perspective view of a bridle constructed in accordance with my invention; and Fig. 2 is an edge elevation of one of the side plates.

In carrying out my invention, I provide two parallel side plates 2, which form levers, the purpose of which will be hereinafter more fully set forth. These plates or levers 2 are preferably formed of thin sheet steel and may be of any suitable material, such as copper, nickle-plated iron or the like, the lower ends thereof projecting inwardly and downwardly and obliquely disposed with respect to the horse's head, as indicated at 3 and formed integral with the plates or levers at their lower ends, are the loops 4 which are connected to the levers by means of the reduced neck portion 5, and detachably connected to said loops are the driving reins 6, by means of which the animal is to be driven and guided.

The levers 2 are provided at a central point with the curved portions 6' which project rearwardly beyond the lower jaw of the horse's head and are provided with suitable openings 7 whereby they are connected by means of the chain 8, said chain extending transversely beneath the lower jaw of the animal and the levers are further connected by means of the chain 9, the ends of which are secured to the levers by means of the openings 10 formed at the junctions of the curved portions 6' and the obliquely disposed portions 3. This chain 9 extends over the nose of the animal and is tightly fitted around the animal's nose whereby when pulling power is applied to the reins 6, the animal may be readily guided. The levers 2 are provided at their upper ends with longitudinal slots 11 which may be formed within the levers to provide for the saving of material and to make the same comparatively light and, at the same time, they may be curved in various designs for ornamental purposes.

The extreme upper ends of the levers are provided with transverse slots 12 in which the lower ends of the cheek straps 13 are removably arranged, said cheek straps being connected by means of the brow band 14. From this arrangement, it will be readily apparent that when pulling power is applied to either side of the horse's head, the chains 8 and 9 will bear upon the animal's head and turn the animal in the desired direction. It will be noted that by having the chains 8 and 9 arranged as above described and indicated in the accompanying drawings, the advance of the animal may be readily checked by pulling upon the reins 6, as the chain 8 will engage the lower jaw of the animal, whereas the chain 9 which is arranged across the nose thereof will bear upon the animal's nostrils and tend to check the animal. It will be readily apparent that my improved bridle comparatively takes the place of a halter whereby the bridle will not have to be removed when it is desired to feed or water the animal in view of the fact that there is no cross bit arranged in the animal's mouth to interfere with the feeding of the animal. It will also be apparent that my improved bridle is extremely simple in construction and can be manufactured and placed upon the market at a comparatively low cost.

While I have shown and described the preferred form of my invention, it will be obvious that various changes in the details of construction and in the proportions may be resorted to for successfully carrying my invention into practice, without sacrificing any of the novel features or departing from the scope of the appended claim.

Arranged within the chains 8 and 9 are the hook members 8' and 9' which are adapted to be engaged with the links of the chain, whereby said chains may be readily adjusted for application to various sized heads and it will be apparent that if so desired, the ends of the chain 8 may be disconnected so that the bridle may be arranged over the horse's head from the front thereof and then connected together after the same has been fitted into position. It will be seen from this construction that the bridle may be quickly and readily applied to or removed from the animal's head.

Having thus described this invention, what I claim is:—

A device of the class described including spaced levers having curved portions formed adjacent each end thereof and extending in opposite directions, said levers having transverse openings formed in the curved portions thereof, said levers being provided adjacent their upper ends with elongated slots and further provided with transverse elongated openings formed in the extreme upper ends, a head strap having its ends removably arranged within said elongated slots, neck portions formed integral with the lower ends of the levers upon the outer sides thereof, said neck portions extending transversely with respect to the levers and arranged in spaced relation with the outer faces of the levers, loops formed at the outer ends of said neck portions, straps secured thereto, chains connecting said levers, one of said chains being secured to the outer longitudinal edges of the levers and adapted to extend across the nose of the animal, said chain having removably connected ends whereby the same may be adjusted, and a second chain secured to the inner longitudinal edges of the levers, said last named chain being adapted to extend underneath the jaw of the animal and provided with a hook whereby it may be quickly and readily adjusted.

In testimony whereof I hereunto affix my signature in the presence of two witnesses.

OLE GRADBERG.

Witnesses:
 FRANK A. SANDIN,
 F. K. CONVERSE.